US012755368B2

(12) United States Patent
Katz

(10) Patent No.: US 12,755,368 B2
(45) Date of Patent: Oct. 6, 2026

(54) SYSTEMS AND METHODS TO DETECT A SCRATCH

(71) Applicant: Cloud Software Group, Inc., Ft. Lauderdale, FL (US)

(72) Inventor: David Warren Katz, Ashland, OR (US)

(73) Assignee: Cloud Software Group, LLC, Fort Lauderdale, FL (US)

( * ) Notice: Subject to any disclaimer, the term of this patent is extended or adjusted under 35 U.S.C. 154(b) by 198 days.

(21) Appl. No.: 17/964,793

(22) Filed: Oct. 12, 2022

(65) Prior Publication Data

US 2024/0127424 A1 Apr. 18, 2024

(51) Int. Cl.
*G06V 10/44* (2022.01)
*G06F 18/243* (2023.01)
*G06T 7/00* (2017.01)

(52) U.S. Cl.
CPC ............ *G06T 7/001* (2013.01); *G06F 18/243* (2023.01)

(58) Field of Classification Search
CPC ........ G06T 7/001; G06F 18/243; G06V 10/44
See application file for complete search history.

(56) References Cited

U.S. PATENT DOCUMENTS

| | | | | |
|---|---|---|---|---|
| 5,913,105 A | | 6/1999 | McIntyre et al. | |
| 5,987,187 A | * | 11/1999 | Wischermann | H04N 5/21 348/E5.049 |
| 6,493,645 B1 | | 12/2002 | Hladschik | |
| 7,181,059 B2 | * | 2/2007 | Duvdevani | G06V 10/94 382/199 |
| 11,150,200 B1 | * | 10/2021 | Watson | G01N 21/8851 |
| 2004/0252879 A1 | * | 12/2004 | Tiemeyer | G06V 10/70 356/237.4 |
| 2023/0085384 A1 | * | 3/2023 | Lütgehetmann | H04N 23/64 382/103 |

FOREIGN PATENT DOCUMENTS

| | | | | |
|---|---|---|---|---|
| JP | 2020101417 A | * | 7/2020 | |
| WO | WO-0111565 A2 | * | 2/2001 | G06T 7/001 |
| WO | WO-0221111 A1 | * | 3/2002 | H01L 22/20 |

* cited by examiner

*Primary Examiner* — Samir A Ahmed

(57) ABSTRACT

Systems and methods to detect a scratch are provided. The method includes identifying, via an OPTICS technique, a cluster of points on an image. The method also includes utilizing a principal curves technique to identify a curve that approximates one or more points of the cluster of points as a smooth curve. The method further includes determining one or more characteristics of the curve. The method further includes determining one or more characteristics of the cluster. The method further includes identifying a scratch based on at least one of the one or more characteristics of the curve and the one or more characteristics of the cluster.

12 Claims, 5 Drawing Sheets

SYSTEMS AND METHODS TO DETECT A SCRATCH

BACKGROUND

The present disclosure relates generally to systems and methods to detect a scratch.

Convolutional neural networks are often utilized for image processing and scratch detection. Convolutional neural networks are often supervised learning algorithms which require labels and large numbers of labeled images, which may be difficult and financially costly to obtain. In that regard, convolutional neural networks and other deep-learning methods are not only financially costly and require significant computational time, but are also resource intensive.

BRIEF DESCRIPTION OF THE DRAWINGS

Illustrative embodiments of the present invention are described in detail below with reference to the attached drawing figures, which are incorporated by reference herein, and wherein.

Figure 1:
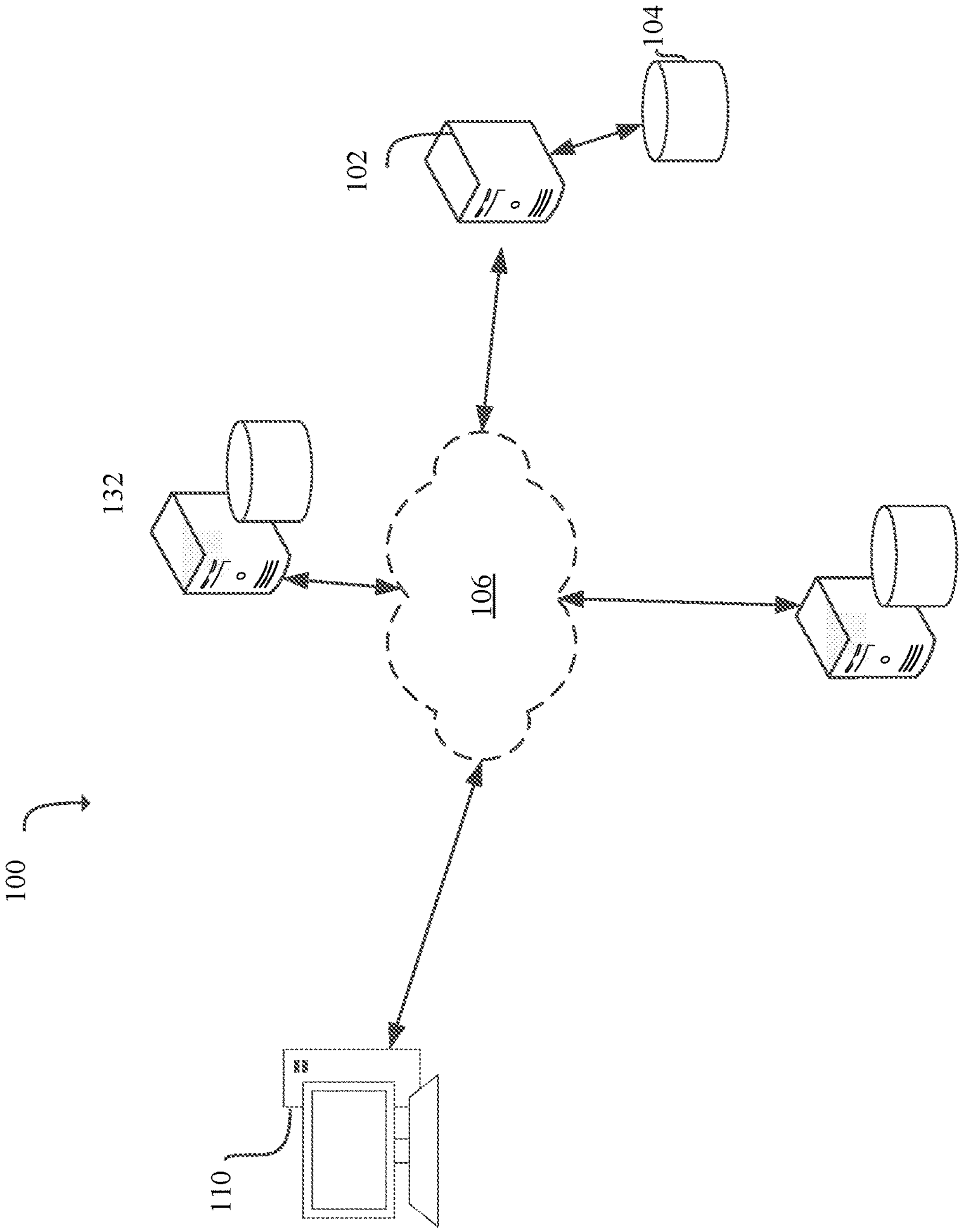
FIG. 1 is a network environment for detecting a scratch.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to systems and methods to detect a scratch. A scratch detection system analyzes images for the presence of scratches on the images. As referred to herein, a scratch is a pattern present on an image. In some embodiments, a scratch is represented by a cluster of points ("cluster") that have values (e.g., 1) that are different from values of points (e.g., 0) of other sections of the image where the scratch is not present. The scratch detection system identifies via one or more techniques, such as an Ordering Points to Identify the Clustering Structure ("OPTICS") technique, one or more clusters of points on an image. In some embodiments, the scratch detection system obtains or generates an OPTICS reachability plot and analyzes the plot to identify one or more clusters on the image. In some embodiments, the scratch detection system identifies one or more overlapping clusters of points, wherein each cluster of points of the one or more overlapping clusters of points is within a threshold distance of one or more other clusters of points of the overlapping clusters of points, thereby creating one or more connected dense regions of the image. In some embodiments, the scratch detection system also extracts the cluster of points from the image to perform additional analysis of the extracted cluster.

The scratch detection system utilizes a principal curves technique to identify a curve that approximates one or more points of the cluster with a smooth curve. Further, the scratch detection system determines characteristics of the curve and the cluster. Characteristics of the curve include, but are not limited to, the length of the curve, the curvature of the curve, the position of the curve relative to the cluster, the position of the curve relative to other curves and clusters, as well as other characteristics associated with the curve. Characteristics of the cluster include, but are not limited to, the width of the cluster, the root mean square width of the cluster, the length of the cluster, the ratio between the length of the cluster and the width of the cluster, the ratio between the length of the curve and the width of the cluster, the distances from the curve to one or more points of the cluster, the distance between the cluster and other clusters and curves of the image, and other characteristics associated with the cluster. The scratch detection system identifies the scratch as well as characteristics of the scratch based on one or more characteristics of the curve and/or the cluster. In some embodiments, the scratch detection system identifies one or more patterns of the scratch (e.g., the length of the scratch, the width of the scratch, the curvature of the scratch, as well as other patterns of the scratch) based on the characteristics of the cluster and/or the curve.

The scratch detection system is configured to sequentially and/or simultaneously analyze an image for the presence of multiple scratches and perform the operations described herein to determine characteristics of curves and clusters associated with different scratches, as well as patterns associated with different scratches. More particularly, utilizing the described techniques herein, including identifying clusters with an OPTICS technique and utilizing a principal curves technique to identify curves associated with the clusters reduce the computational cost of identifying scratches, thereby allowing multiple scratches to be sequentially or simultaneously identified and analyzed.

The scratch detection system is also configured to sequentially and/or simultaneously analyze multiple images for the presence of one or more scratches, and perform the operations described herein to determine characteristics of curves and clusters associated with different scratches, as well as patterns associated with different scratches on multiple images. More particularly, utilizing the described techniques herein, including identifying clusters with an OPTICS technique and utilizing a principal curves technique to identify curves associated with the clusters reduce the computational cost of identifying scratches, thereby allowing multiple images to be sequentially or simultaneously analyzed to identify and analyze scratches on the images. In some embodiments, the scratch detection system includes or is communicatively connected to multiple processing systems or processors, and the scratch detection system is further configured to balance the workload of the processing systems and processors to evenly distribute the workload to sequentially or simultaneously analyze different scratches on an image, or sequentially or simultaneously analyze different images. Additional descriptions of the scratch detection system and operations performed by the scratch detection system are provided in the paragraphs below and are illustrated in at least FIGS. 1-5.

FIG. 1 is a network environment 100 for detecting a scratch in accordance with one embodiment. Network environment 100 includes a scratch detection system 102 that is communicatively connected to an electronic device 110 via a network 106.

Scratch detection system 102 may be formed from one or more work management stations, server systems, desktop computers, laptop computers, tablet computers, smartphones, smart watches, virtual reality systems, augmented reality systems, as well as similar electronic devices having one or more processors operable to identify, via an OPTICS technique, a cluster of points on an image, utilize a principal curves technique to identify a curve that approximates one or more points of the cluster of points as a smooth curve, determine one or more characteristics of the curve, determine one or more characteristics of the cluster, and identify a scratch based on at least one of the one or more characteristics of the curve and the one or more characteristics of the cluster. Additional descriptions of operations performed by scratch detection system 102 are provided herein and are illustrated in at least FIGS. 2-5. Scratch detection system 102 includes or is communicatively connected to a storage medium, such as storage medium 104. Storage medium 104 stores instructions, which when executed by one or more processors of scratch detection system 102, cause the processors to perform the foregoing operations as well as other operations described herein. Storage medium 104, in addition to storing executable instructions, also stores images such as image 200 of FIG. 2, extracted clusters, such as clusters 220 and 240 of FIGS. 3A and 3B, and algorithms utilized to perform one or more operations described herein. Storage medium 104 may be formed from data storage components such as, but not limited to, read-only memory (ROM), random access memory (RAM), flash memory, magnetic hard drives, solid state hard drives, CD-ROM drives, DVD drives, floppy disk drives, as well as other types of data storage components and devices. In some embodiments, storage medium 104 includes multiple data storage devices. In further embodiments, the multiple data storage devices may be physically stored at different locations. In one of such embodiments, the data storage devices are components of a server station, such as a cloud server. In another one of such embodiments, the data storage devices are components of scratch detection system 102.

Figure 2:
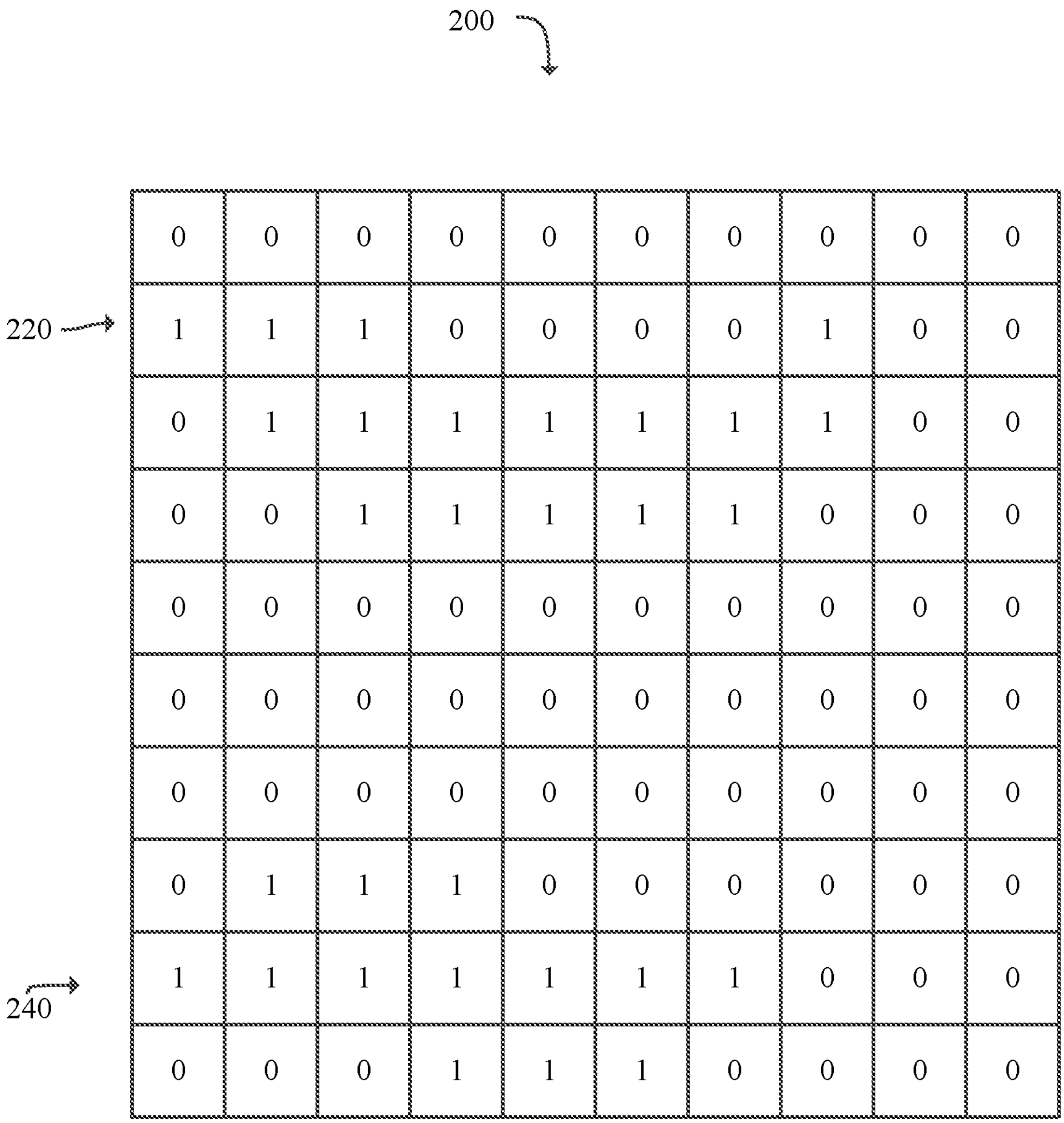
FIG. 2 is an illustration of an image having two clusters of points, each indicative of a scratch.

Scratch detection system 102 identifies a cluster of points on an image, such as image 200 of FIG. 2. In the embodiment of FIG. 1, scratch detection system 102 utilizes an OPTICS technique to identify a cluster of points on the image. Scratch detection system 102 then identifies a curve that approximates one or more points of the cluster with a smooth curve, such as curve 320 of FIG. 3A or curve 340 of FIG. 3B. In the embodiment of FIG. 1, scratch detection system 102 utilizes a principal curves technique to identify a curve that approximates one or more points of the cluster with a smooth curve. Scratch detection system 102 then determines one or more characteristics of the curve including, but not limited to, the length of the curve, the curvature of the curve, the position of the curve relative to the cluster, the position of the curve relative to other curves and clusters, as well as other characteristics associated with the curve. Scratch detection system 102 also determines one or more characteristics of the cluster, including, but not limited to, the width of the cluster, the root mean square width of the cluster, the length of the cluster, the ratio between the length of the cluster and the width of the cluster, the ratio between the length of the curve and the width of the cluster, the distances from the curve to one or more points of the cluster, the distance between the cluster and other clusters and curves of the image, and other characteristics associated with the cluster. Scratch detection system 102 identifies a scratch based on at least one of the one or more characteristics of the curve and the one or more characteristics of the cluster. In some embodiments, scratch detection system 102 also identifies one or more patterns associated with the scratch. In the depicted embodiment, scratch detection system 102 also provides the image containing the scratch and data indicative of the scratch for display on a display screen of electronic device 110.

Electronic device 110 includes any devices that are operable to provide the scratch and data indicative of the scratch for display. In some embodiments, electronic device 110 is also operable to receive instructions from a user of electronic device 110, to analyze the scratch and to input additional characteristics and parameters to refine and modify existing operations performed by scratch detection system 102, and provide additional instructions to scratch detection system 102 to run operations to identify additional scratches on the image or other images. In the embodiment of FIG. 1, electronic device 110 is a desktop computer. Additional examples of electronic devices include, but are not limited to, laptop computers, tablet computers, smartphones, smart watches, virtual reality systems, augmented reality systems, as well as similar electronic devices having a processor operable to provide the scratch and data indicative of the scratch for display.

Scratch detection system 102 is also communicatively connected to systems 122 and 132. In some embodiments, some of the operations described herein are performed by systems 122 and/or 132 to balance the workload. For example, scratch detection system 102, in response to receiving instructions to detect scratches on an image, splits the image into three regions, where scratch detection system 102, system 122, and system 132 is each assigned to detect scratches on a different region of the image. Similarly, where scratch detection system 102 is instructed to analyze multiple images, scratch detection system 102 is configured to distribute the images among scratch detection system 102, system 122, and system 132 to balance the workload of each individual system. The foregoing operations reduce the workload of a single system, thereby reducing not only the duration of the operation, but also the stress on a single system.

Network 106 can include, for example, any one or more of a cellular network, a satellite network, a personal area network (PAN), a local area network (LAN), a wide area network (WAN), a broadband network (BBN), an RFID network, a Bluetooth network, a device-to-device network, the Internet, and the like. Further, network 106 can include, but is not limited to, any one or more of the following network topologies, including a bus network, a star network, a ring network, a mesh network, a star-bus network, a tree or hierarchical network, or similar network architecture. Network 106 may be implemented using different protocols of the internet protocol suite such as TCP/IP. Network 106 includes one or more interfaces for data transfer. In some embodiments, network 106 includes a wired or wireless networking device (not shown) operable to facilitate one or more types of wired and wireless communication between scratch detection system 102, electronic device 110, systems 122 and 132, as well as other electronic devices (not shown) and systems (not shown) communicatively connected to network 106. Examples of the networking device include, but are not limited to, wired and wireless routers, wired and wireless modems, access points, as well as other types of suitable networking devices described herein. Examples of wired and wireless communication include Ethernet, WiFi, Cellular, LTE, GPS, Bluetooth, and RFID, as well as other types of communication modes described herein.

Although FIG. 1 illustrates scratch detection system 102 and two additional systems 122 and 132, in some embodiments, scratch detection system 102 is communicatively connected to a different number of systems and configured to instruct one or more of the systems to work in parallel. Further, although FIG. 1 illustrates one electronic device 110, in some embodiments, scratch detection system 102 is communicatively connected to multiple electronic devices, each configured to provide one or more identified scratches for display, and to provide additional instructions to scratch detection system 102.

FIG. 2 is an illustration of an image 200 having two clusters of points 220 and 240, each indicative of a scratch. As shown in FIG. 2, clusters 220 and 240 are clusters of points having values (1) that are different from the values of points (0) that are not identified as clusters. In the embodiment of FIG. 2, scratch detection system 102 of FIG. 1 applies techniques described herein (such as the OPTICS technique) to identify candidates of scratches based on the values associated with different points of the image, where clusters of points having the value of 1 are identified as candidates of scratches. In some embodiments, scratch detection system 102 also divides image 200 into different regions, and sequentially or simultaneously analyzes the different regions for candidates of scratches.

In the embodiment of FIG. 2, scratch detection system 102 also determines one or more characteristics of clusters 220 and 240, such as, but not limited to, the length of each cluster 220 and 240, the width of each cluster 220 and 240, the curvature of each cluster 220 and 240, the distance between clusters 220 and 240, the locations of clusters 220 and 240 with respect to each other and with respect to image 200, and other identifiable characteristics of clusters 220 and 240. In the embodiment of FIG. 2, scratch detection system 102 also extracts clusters 220 and 240 from image 200. In some embodiments, scratch detection system 102 applies a hierarchically approach to extract clusters 220 and 240. In some embodiments, scratch detection system 102 applies a discrete approach to extract clusters 220 and 240. In some embodiments, scratch detection system 102 applies one or more different approaches to extract clusters 220 and 240, as well as other scratches.

Although FIG. 2 illustrates an image 200 having a square shape, scratch detection system 102 is configured to analyze images having different shapes including, but not limited to, rectangular shapes, circular shapes, elliptical shapes, irregular shapes, and other shapes of images. Further, although FIG. 2 illustrates two clusters 220 and 240, in some embodiments, a different number of clusters are present on image 200 or on other images. Further, although FIG. 2 illustrates points associated with values of 0 or 1, in some embodiments, different points of image 200 are associated with intermediary values that are not 0 or 1. Further, in some embodiments, one or more identified clusters (not shown) overlap each other, thereby creating one or more connected dense regions. Further in some embodiments, two or more clusters are discrete clusters that do not overlap.

Figure 3A:
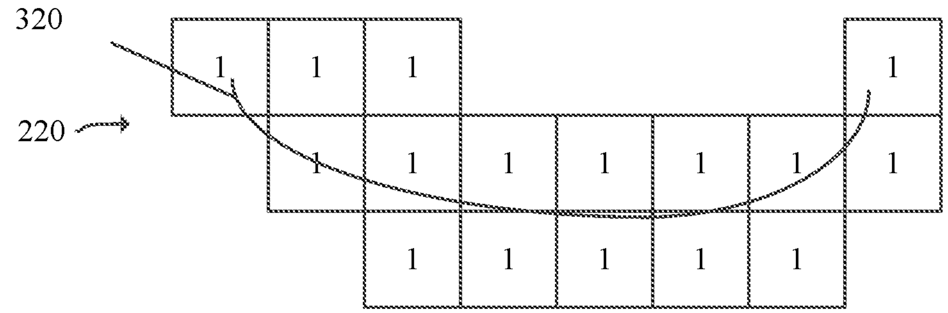
FIG. 3A is an illustration of one cluster of points of the image of FIG. 2 after the cluster has been extracted from the image of FIG. 2.

FIG. 3A is an illustration of one cluster of points 220 of the image of FIG. 2 after cluster 220 has been extracted from the image of FIG. 2. Scratch detection system 102 of FIG. 1 applies techniques described herein (such as the principal curves technique) to identify a curve 320 that approximates different points of cluster 220 as a smooth curve. In some embodiments, scratch detection system 102 applies a principal curves technique to generate a smooth curve that approximates the points of cluster 220.

In the embodiment of FIG. 3A, scratch detection system 102 also identifies one or more characteristics of curve 320 including, but not limited to, the length of curve 320, the curvature of curve 320, the position of curve 320 relative to cluster 220, distance between curve 320 and different points of cluster 220, the position of curve 320 relative to other curves and clusters (such as curve 340 and cluster 240), as well as other characteristics associated with curve 320. In the embodiment of FIG. 3A, scratch detection system 102 also identifies one or more characteristics of cluster 220 including, but not limited to, the width of cluster 220, the root mean square width of cluster 220, the length of cluster 220, the ratio between the length of cluster 220 and the width of cluster 220, the ratio between the length of curve 320 and the width of cluster 220, the distances from curve 320 to one or more points of cluster 220, the distance between cluster 220 and other clusters and curves (such as curve 340 and cluster 240), and other characteristics associated with cluster 220. Although FIG. 3A illustrates curve 320 as having a specific curvature, in some embodiments curve 320 has a different shape, orientation, and/or curvature.

Figure 3B:
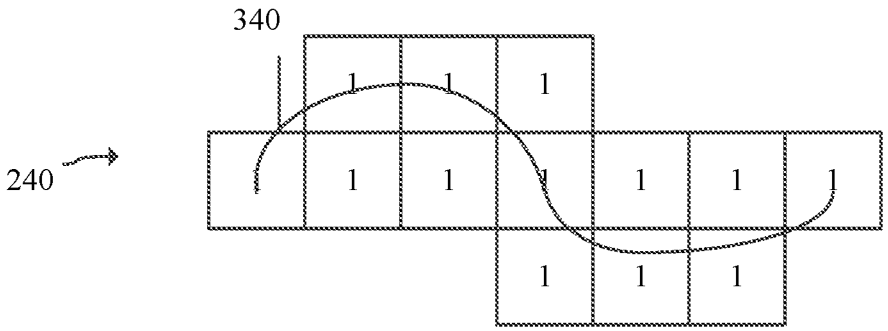
FIG. 3B is an illustration of another cluster of points of the image of FIG. 2 after the cluster has been extracted from the image of FIG. 2.

FIG. 3B is an illustration of another cluster of points of the image of FIG. 2 and is an illustration of one cluster of points 240 of the image of FIG. 2 after cluster 240 has been extracted from the image of FIG. 2. Scratch detection system 102 of FIG. 1 applies techniques described herein to identify a curve 340 that approximates different points of cluster 240 as a curve. In some embodiments, scratch detection system 102 applies a principal curves technique to generate a smooth curve that approximates the points of cluster 240.

In the embodiment of FIG. 3B, scratch detection system 102 also identifies one or more characteristics of curve 340 including, but not limited to, the length of curve 340, the curvature of curve 340, the position of curve 340 relative to cluster 240, distance between curve 340 and different points of cluster 240, the position of curve 340 relative to other curves and clusters (such as curve 320 and cluster 220), as well as other characteristics associated with curve 340. In the embodiment of FIG. 3B, scratch detection system 102 also identifies one or more characteristics of cluster 240 including, but not limited to, the width of cluster 240, the root mean square width of cluster 240, the length of cluster 240, the ratio between the length of cluster 240 and the width of cluster 240, the ratio between the length of curve 340 and the width of cluster 240, the distances from curve 340 to one or more points of cluster 240, the distance between cluster 240 and other clusters and curves (such as curve 320 and cluster 220), and other characteristics associated with cluster 240. Although FIG. 3B illustrates curve 340 as having a specific curvature, in some embodiments curve 340 has a different shape, orientation, and/or curvature.

Figure 4:
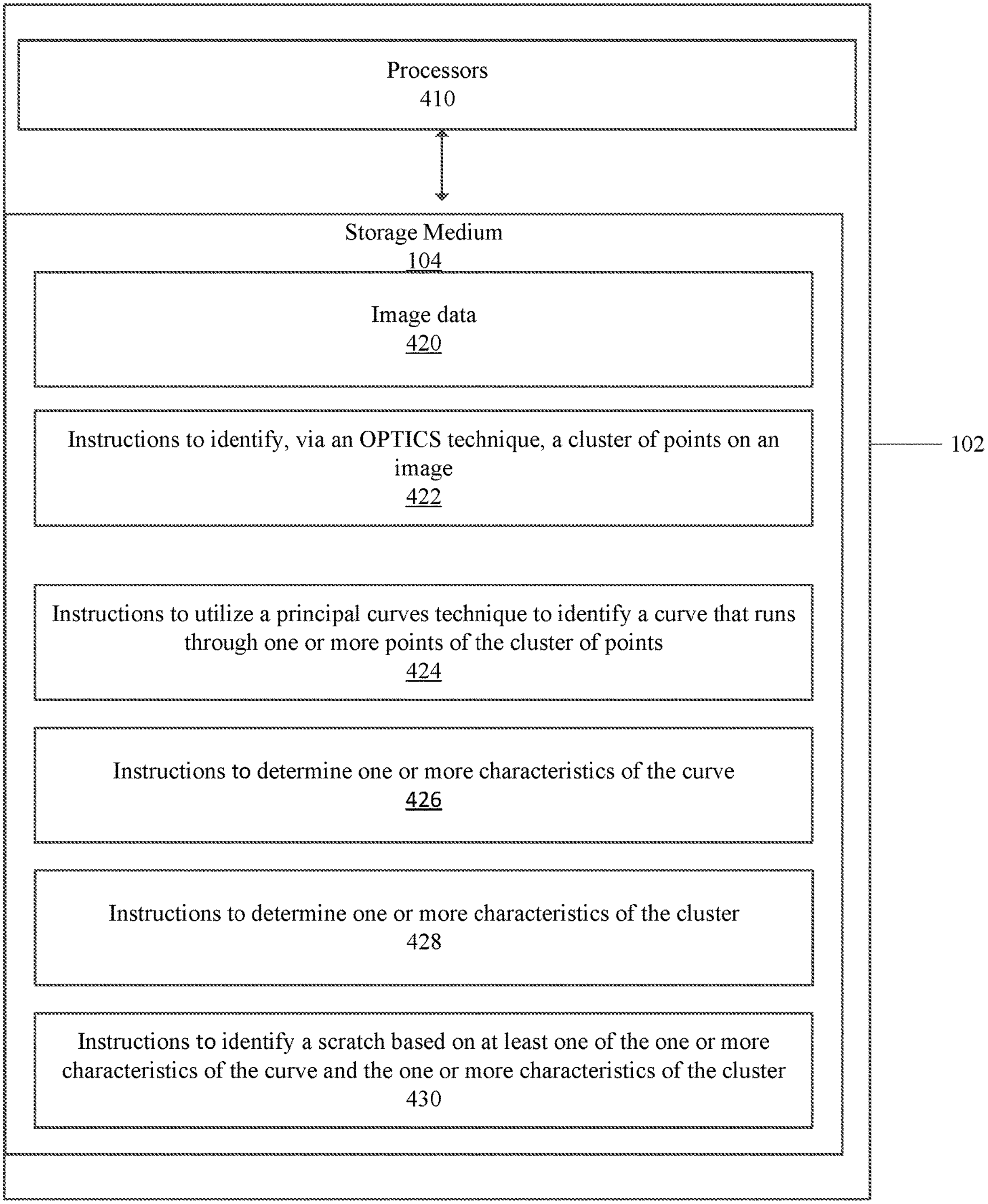
FIG. 4 is a system diagram of the scratch detection system of FIG. 1.

FIG. 4 is a system diagram of scratch detection system 102 of FIG. 1 in accordance with one embodiment. Scratch detection system 102 includes or is communicatively connected to storage medium 104 and processors 410. Data indicative of images ("image data") are stored at location 420 of storage medium 104. Instructions to identify, via an OPTICS technique, a cluster of points on an image are stored at location 422. Further, instructions to utilize a principal curves technique to identify a curve that approximates one or more points of the cluster of points as a smooth curve are stored at location 424. Further, instructions to determine one or more characteristics of the curve are stored at location 426. Further, instructions to determine one or more characteristics of the cluster are stored at location 428. Further, instructions to identify a scratch based on at least one of the one or more characteristics of the curve and the one or more characteristics of the cluster are stored at location 430. Further, instructions to perform operations described herein and shown in at least FIG. 5 are also stored in storage medium 104.

Figure 5:
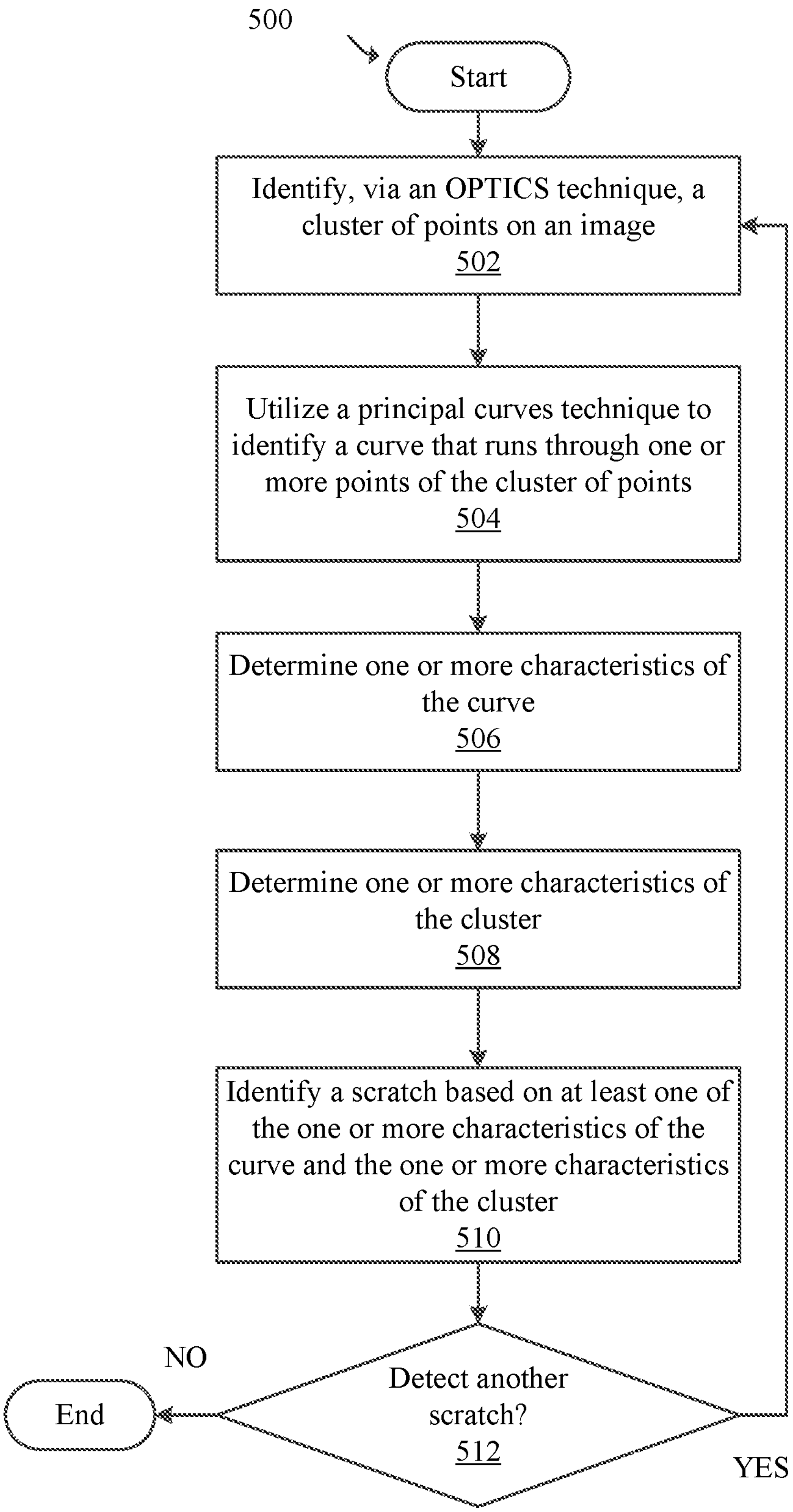
FIG. 5 is a flowchart of a process to detect a scratch.

FIG. 5 is a flow chart illustrating a process 500 to detect a scratch in accordance with one embodiment. Although the operations in process 500 are shown in a particular sequence, certain operations may be performed in different sequences or at the same time where feasible. Further, although process 500 is described to be performed by processors of scratch detection system 102 of FIG. 1, it is understood that processors of other scratch detection systems are also operable to perform process 500.

At block 502, a scratch detection system, such as scratch detection system 102 of FIG. 1 identifies, via an OPTICS technique, a cluster of points on an image. FIG. 2, for example, illustrates scratch detection system 102 identifying clusters 220 and 240 from image 200. At block 504, the scratch detection system utilizes a principal curves technique to identify a curve that approximates one or more points of the cluster of points as a smooth curve. FIGS. 3A and 3B, for example, illustrate scratch detection system 102 utilizing a principal curves technique to identify curves 320 and 340 that run through clusters 220 and 240, respectively.

At block 506, the scratch detection system determines one or more characteristics of the curve. In the embodiments of FIG. 3A, scratch detection system 102 also identifies one or more characteristics of curve 320 including, but not limited to, the length of curve 320, the curvature of curve 320, the position of curve 320 relative to cluster 220, distance between curve 320 and different points of cluster 220, the position of curve 320 relative to other curves and clusters (such as curve 340 and cluster 240), as well as other characteristics associated with curve 320.

At block 508, the scratch detection system determines one or more characteristics of the cluster. In the embodiment of FIG. 3B, scratch detection system 102 also identifies one or more characteristics of cluster 240 including, but not limited to, the width of cluster 240, the root mean square width of cluster 240, the length of cluster 240, the ratio between the length of cluster 240 and the width of cluster 240, the ratio between the length of curve 340 and the width of cluster 240, the distances from curve 340 to one or more points of cluster 240, the distance between cluster 240 and other clusters and curves (such as curve 320 and cluster 220), and other characteristics associated with cluster 240.

At block 510, the scratch detection system identifies a scratch based on at least one of the one or more characteristics of the curve and the one or more characteristics of the cluster. For example, scratch detection system 102 identifies one or more properties and patterns of a scratch based on characteristics of a corresponding curve identified at block 506 and based on characteristics of a corresponding cluster identified at block 508.

At block 512 a determination of whether to detect another scratch is made. In response to a determination to detect another scratch, process 500 returns to 502, and the operations described herein are repeated. Alternatively, process 500 ends in response to a determination not to detect another scratch. In some embodiments, process 500 is simultaneously performed to detect multiple scratches on a single image. In some embodiments, process 500 is simultaneously performed to detect multiple scratches on multiple different images. In that regard, in some embodiments, process 500 is performed on multiple computing devices of scratch detection system 102 to balance the load of each computing device, improve the overall computing speed of scratch detection system 102, and to reduce the burden on each individual computing device.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure.

Clause 1, a computer-implemented method to detect a scratch, comprising: identifying, via an OPTICS technique, a cluster of points on an image; utilizing a principal curves technique to identify a curve that approximates one or more points of the cluster of points as a smooth curve; determining one or more characteristics of the curve; determining one or more characteristics of the cluster; and identifying a scratch based on at least one of the one or more characteristics of the curve and the one or more characteristics of the cluster.

Clause 2, the computer-implemented method of clause 1, wherein identifying, via the OPTICS technique, the cluster of points comprises identifying, via the OPTICS technique, one or more overlapping clusters of points, wherein each cluster of points of the one or more overlapping clusters of points is within a threshold distance of one or more other clusters of points of the overlapping clusters of points.

Clause 3, the computer-implemented method of clauses 1 or 2, further comprising extracting the cluster of points from the image before the curve is identified.

Clause 4, the computer-implemented method of any of clauses 1-3, further comprising determining a distance from the curve to a point of the cluster, wherein determining the one or more characteristics of the cluster comprises determining the one or more characteristics of the cluster based on the distance from the curve to the point.

Clause 5, the computer-implemented method of any of clauses 1-4, further comprising determining a width of the cluster, wherein one of the one or more characteristics of the cluster is the width of the cluster.

Clause 6, the computer-implemented method of any of clauses 1-5, further comprising determining a ratio of a length of the curve to a width of the cluster, wherein one of the one or more characteristics of the cluster is the ratio of the length of the curve to the width of the cluster.

Clause 7, the computer-implemented method of any of clauses 1-6, further comprising determining a length of the curve, wherein one of the one or more characteristics of the curve is the length of the curve.

Clause 8, the computer-implemented method of any of clauses 1-7, further comprising determining a curvature of the curve, wherein one of the one or more characteristics of the curve is the curvature of the curve.

Clause 9, the computer-implemented method of any of clauses 1-8, further comprising identifying a pattern associated with the scratch based on the one or more characteristics of the curve.

Clause 10, the computer-implemented method of any of clauses 1-9, further comprising: identifying, via the OPTICS technique, a second cluster of points on the image; utilizing the principal curves technique to identify a second curve that approximates one or more points of the second cluster of points as a second smooth curve; determining one or more characteristics of the second curve; determining one or more characteristics of the second cluster; and identifying a second scratch based on at least one of the one or more characteristics of the second curve and the one or more characteristics of the second cluster.

Clause 11, the computer-implemented method of any of clauses 1-10, further comprising: identifying, via the OPTICS technique, a second cluster of points on second image; utilizing the principal curves technique to identify a second curve that approximates one or more points of the second cluster of points as a second smooth curve; determining one or more characteristics of the second curve; determining one or more characteristics of the second cluster; and identifying a second scratch based on at least one of the one or more characteristics of the second curve and the one or more characteristics of the second cluster.

Clause 12, a scratch detection system, comprising: a storage medium; and one or more processors configured to: identify, via an OPTICS technique, a cluster of points on an image; utilize a principal curves technique to identify a curve that approximates one or more points of the cluster of points as a smooth curve; determine one or more characteristics of the curve; determine one or more characteristics of the cluster; and identify a scratch based on at least one of the one or more characteristics of the curve and the one or more characteristics of the cluster.

Clause 13, the scratch detection system of clause 12, wherein the one or more processors are further configured to extract the cluster of points from the image before the curve is identified.

Clause 14, the scratch detection system of clauses 12 or 13, wherein the one or more processors are further configured to determine a distance from the curve to a point of the cluster, wherein from the curve to a point of the cluster is one of the one or more characteristics of the cluster.

Clause 15, the scratch detection system of any of clauses 12-14, wherein the one or more processors are further configured to determine a width of the cluster, wherein the width of the cluster is one of the one or more characteristics of the cluster.

Clause 16, the scratch detection system of any of clauses 12-15, wherein the one or more processors are further configured to determine a ratio of a length of the curve to a width of the cluster, wherein the ratio of the length of the curve to the width of the cluster is one of the one or more characteristics of the cluster.

Clause 17, the scratch detection system of any of clauses 12-16, wherein the one or more processors are further configured to: identify, via the OPTICS technique, a second cluster of points on the image; utilize the principal curves technique to identify a second curve that approximates one or more points of the second cluster of points as a second smooth curve; determine one or more characteristics of the second curve; determine one or more characteristics of the second cluster; and identify a second scratch based on at least one of the one or more characteristics of the second curve and the one or more characteristics of the second cluster.

Clause 18, the scratch detection system of any of clauses 12-17, wherein the one or more processors are further configured to: identify, via the OPTICS technique, a second cluster of points on second image; utilize the principal curves technique to identify a second curve that approximates one or more points of the second cluster of points as a second smooth curve; determine one or more characteristics of the second curve; determine one or more characteristics of the second cluster; and identify a second scratch based on at least one of the one or more characteristics of the second curve and the one or more characteristics of the second cluster.

Clause 19, a non-transitory computer-readable medium comprising instructions, which when executed by a processor, causes the processor to perform operations comprising: identifying, via an OPTICS technique, a cluster of points on an image; utilizing a principal curves technique to identify a curve that approximates one or more points of the cluster of points as a smooth curve; determining one or more characteristics of the curve; determining one or more characteristics of the cluster; and identifying a scratch based on at least one of the one or more characteristics of the curve and the one or more characteristics of the cluster.

Clause 20, the non-transitory computer-readable medium of clause 19, wherein the instruction, when executed by the processor, cause the processor to perform operations comprising: identifying, via an OPTICS technique, a second cluster of points on second image; utilizing the principal curves technique to identify a second curve that approximates one or more points of the second cluster of points as a second smooth curve; determining one or more characteristics of the second curve; determining one or more characteristics of the second cluster; and identifying a second scratch based on at least one of the one or more characteristics of the second curve and the one or more characteristics of the second cluster.

As used herein, the singular forms "a," "an," and "the" are intended to include the plural forms as well, unless the context clearly indicates otherwise. It will be further understood that the terms "comprise" and/or "comprising," when used in this specification and/or in the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A computer-implemented method to detect a scratch, comprising:

identifying, via an Ordering Points To Identify The Clustering Structure (OPTICS) technique, a cluster of points of an image represented by a digital image file;

utilizing a principal curves technique to identify a curve that approximates one or more points of the cluster of points as a smooth curve;

determining one or more characteristics of the curve by:

determining a length of the curve;

determining a curvature of the curve;

determining a width of the curve;

determining a ratio of the length of the curve to a width of the cluster, wherein one of the one or more characteristics of the cluster is the ratio of the length of the curve to the width of the cluster;

determining a ratio of a length of the curve to a width of the cluster;

determining a position of the curve relative to the cluster by calculating a distance between the curve and at least one point within the cluster;

determining one or more characteristics of the cluster;

identifying a scratch based on at least one of the one or more characteristics of the curve and the one or more characteristics of the cluster; and identifying one or more of a length, a width, and a curvature of the scratch based on one or more of the length, the curvature, and the position of the curve relative to the cluster.

2. The computer-implemented method of claim 1, wherein identifying, via the OPTICS technique, the cluster of points comprises identifying, via the OPTICS technique, one or more overlapping clusters of points, wherein each cluster of points of the one or more overlapping clusters of points is within a threshold distance of one or more other clusters of points of the overlapping clusters of points.

3. The computer-implemented method of claim 1, further comprising extracting the cluster of points from the image before the curve is identified.

4. The computer-implemented method of claim 1, further comprising determining a width of the cluster, wherein one of the one or more characteristics of the cluster is the width of the cluster.

5. The computer-implemented method of claim 1, further comprising:

identifying, via the OPTICS technique, a second cluster of points on the image;

utilizing the principal curves technique to identify a second curve that approximates one or more points of the second cluster of points as a second smooth curve;

determining one or more characteristics of the second curve;

determining one or more characteristics of the second cluster; and identifying a second scratch based on at least one of the one or more characteristics of the second curve and the one or more characteristics of the second cluster.

6. The computer-implemented method of claim 1, further comprising:

identifying, via the OPTICS technique, a second cluster of points on second image;

utilizing the principal curves technique to identify a second curve that approximates one or more points of the second cluster of points as a second smooth curve;

determining one or more characteristics of the second curve;

determining one or more characteristics of the second cluster; and identifying a second scratch based on at least one of the one or more characteristics of the second curve and the one or more characteristics of the second cluster.

7. A scratch detection system, comprising:

a storage medium; and one or more processors configured to:

identify, via an Ordering Points To Identify The Clustering Structure (OPTICS) technique, a cluster of points on an image;

utilize a principal curves technique to identify a curve that approximates one or more points of the cluster of points as a smooth curve;

determine one or more characteristics of the curve by:

determining a length of the curve;

determining a curvature of the curve;

determining a width of the curve;

determining a ratio of the length of the curve to a width of the cluster, wherein one of the one or more characteristics of the cluster is the ratio of the length of the curve to the width of the cluster;

determining a ratio of a length of the curve to a width of the cluster;

determining a position of the curve relative to the cluster by calculating a distance between the curve and at least one point within the cluster;

determine one or more characteristics of the cluster;

identify a scratch based on at least one of the one or more characteristics of the curve and the one or more characteristics of the cluster; and identify one or more of a length, a width, and a curvature of the scratch based on one or more of the length, the curvature, and the position of the curve relative to the cluster.

8. The scratch detection system of claim 7, wherein the one or more processors are further configured to extract the cluster of points from the image before the curve is identified.

9. The scratch detection system of claim 7, wherein the one or more processors are further configured to:

identify, via the OPTICS technique, a second cluster of points on the image;

utilize the principal curves technique to identify a second curve that approximates one or more points of the second cluster of points as a second smooth curve;

determine one or more characteristics of the second curve;

determine one or more characteristics of the second cluster; and identify a second scratch based on at least one of the one or more characteristics of the second curve and the one or more characteristics of the second cluster.

10. The scratch detection system of claim 7, wherein the one or more processors are further configured to:

identify, via the OPTICS technique, a second cluster of points on second image;

utilize the principal curves technique to identify a second curve that approximates one or more points of the second cluster of points as a second smooth curve;

determine one or more characteristics of the second curve;

determine one or more characteristics of the second cluster; and identify a second scratch based on at least one of the one or more characteristics of the second curve and the one or more characteristics of the second cluster.

11. A non-transitory computer-readable medium comprising instructions, which when executed by a processor, causes the processor to perform operations comprising:

identifying, via an Ordering Points To Identify The Clustering Structure (OPTICS) technique, a cluster of points on an image;

utilizing a principal curves technique to identify a curve that approximates one or more points of the cluster of points as a smooth curve;

determining one or more characteristics of the curve by:

determining a length of the curve;

determining a curvature of the curve;

determining a width of the curve;

determining a ratio of the length of the curve to a width of the cluster, wherein one of the one or more characteristics of the cluster is the ratio of the length of the curve to the width of the cluster;

determining a ratio of a length of the curve to a width of the cluster;

determining a position of the curve relative to the cluster by calculating a distance between the curve and at least one point within the cluster;

determining one or more characteristics of the cluster;

identifying a scratch based on at least one of the one or more characteristics of the curve and the one or more characteristics of the cluster; and identifying one or more of a length, a width, and a curvature of the scratch based on one or more of the length, the curvature, and the position of the curve relative to the cluster.

12. The non-transitory computer-readable medium of claim 11, wherein the instruction, when executed by the processor, causes the processor to perform operations comprising:

identifying, via an OPTICS technique, a second cluster of points on second image;

utilizing the principal curves technique to identify a second curve that approximates one or more points of the second cluster of points as a second smooth curve;

determining one or more characteristics of the second curve;

determining one or more characteristics of the second cluster; and identifying a second scratch based on at least one of the one or more characteristics of the second curve and the one or more characteristics of the second cluster.

* * * * *